June 7, 1932.  F. FISHER  1,862,472
POULTRY CATCHER
Filed Nov. 16, 1929
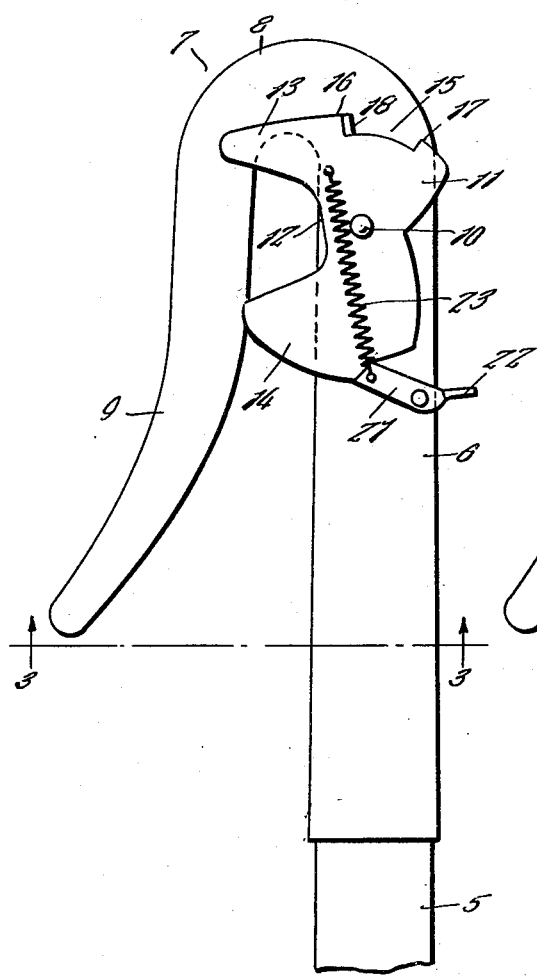
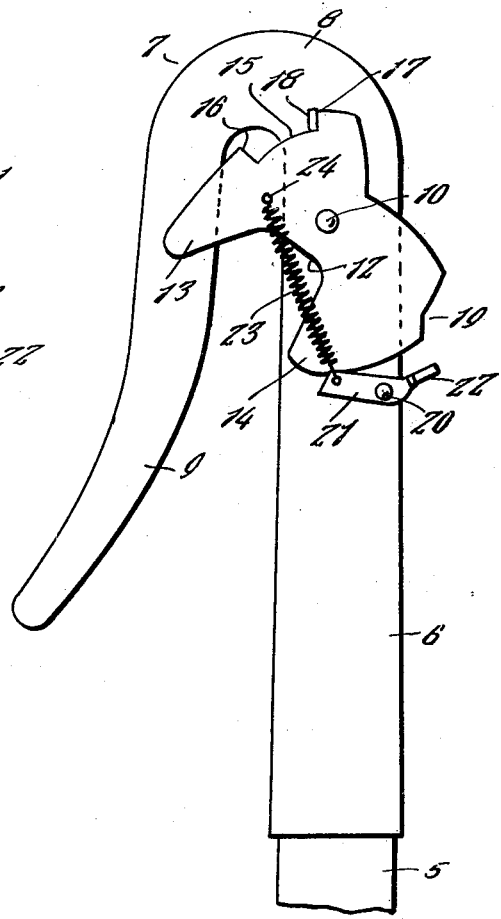
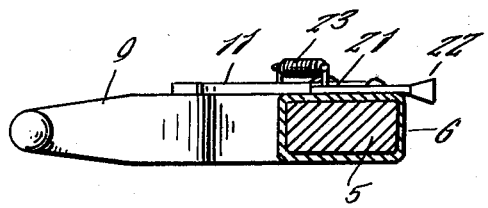
Inventor
Floyd Fisher
By Clarence A. O'Brien
Attorney Patented June 7, 1932

1,862,472

UNITED STATES PATENT OFFICE

FLOYD FISHER, OF FOREST CITY, IOWA

POULTRY CATCHER

Application filed November 16, 1929. Serial No. 407,694.

This invention relates to devices for catching and retaining poultry from roosts or while the poultry is walking along the ground, and it has as a primary object a device for this purpose which is adapted to engage the legs of the chicken or other fowl for trapping the chicken or fowl.

Another very important object of the invention is to provide a device of this character, which is simple in construction, consists of but a comparatively few parts, thoroughly reliable, practical and efficient in operation and otherwise well adapted for the purpose designed.

Other objects and advantages of the invention will become apparent from a study of the following description, taken in connection with the accompanying drawing, wherein:—

Figure 1 is a top plan view of the catcher, the same being shown in a closed or leg retaining position.

Figure 2 is a similar view showing the device in an open position.

Figure 3 is a detail sectional view taken substantially on the line 3—3 of Figure 1 looking upwardly in the direction of the arrows.

With reference more in detail to the drawing, it will be seen that my improved poultry catcher comprises a handle member designated generally by the reference character 5 one end of which handle member 5 is adapted to be received in the elongated tubular shank 6 of a hook-shaped member designated generally by the reference character 7. This member 7 is preferably formed of a single blank of material and comprises the tubular shank portion 6 which at its upper end is curved outwardly and laterally as at 8, said curved portion 8 forming the bight or crown of the hook merging into an outwardly curved hook portion or leg 9.

To one side of the shank 6, adjacent the bight portion 8 of the hook there is pivotally secured as at 10 an angular shaped locking plate designated generally by the reference character 11. The plate 11 on one longitudinal side thereof is provided with a relatively large inwardly directed notch or recess 12 forming upper and lower jaws 13 and 14 respectively. The recess 12 is formed on that side of the plate adjacent the curved arm 9 so that obviously when the plate is swung to that position shown in Figure 1 the arm 9 is utilized for closing the open end of the notch 12 and the jaws 13 and 14 extend across the space between the shank 6 and said arm 9 as is also shown to advantage in Figure 1. The plate 11 at the upper edge thereof and adjacent said side edge remote from the arm 9 is notched as at 15 to provide stops 16 and 17, respectively. The notch 15 accommodates a lug 18 formed on and projecting from the upper end of the shank 6 and against which lug 18 the stop shoulders 16 and 17 are adapted to alternately engage for limiting the swinging movement of the plate 11 upon its pivot 10.

The plate 11 at its lower right hand corner is notched as at 19, while adjacent the lower end of the plate 11 there is pivoted to the shank 6 as at 20 a dog or latch 21, one end of which is adapted to engage in the notch 19 for retaining the plate 11 in that position shown in Figure 1 for closing the leg receiving recess or notch 12 as before described. At its opposite end the latch or dog 21 is suitably formed to provide a finger grip 22.

For normally retaining said one end of the latch 20 in engagement with the notch 19, there is provided a coil spring 23, one end of which is secured to said one end of the latch 21 and the other end of which is anchored as at 24 to an adjacent side of the plate 11 above the leg receiving recess 12.

In actual practice the plate is normally disposed in that position shown in Figure 2 so that in use, the hook 7 is first hooked over the leg of the chicken or poultry and a slight pull of the device toward the operator with the jaw 13 engaging the leg of the fowl will rotate the plate about its pivot pin so that the plate will assume that position shown in Figure 1 with the leg of the chicken within the leg receiving recess 12 of the plate which recess 12 is now closed through the medium of the hook arm 9. When in this position the spring 23 effects an upward pull on the latch 21 for drawing said end of the latch into the notch 19 thus locking the plate in this position and retaining the leg of the poultry within the recess 12. To free the chicken, a slight upward pressure by the finger on the finger grip 22 will move the latch upon its pivot 20 against the action of the spring 23 for moving the same out of locking engagement with the notch 19 and thus the plate will swing to its normal position or that position shown in Figure 2 whereby the recess 12 is opened and the leg of the poultry extracted therefrom.

It is believed that from the foregoing, a clear understanding of the operation, construction, utility and advantages of a device of this character will be had by those skilled in this art without a more detailed description.

Even though I have herein shown and described the preferred embodiment of my invention, it is to be understood that the same is susceptible to changes comprehended by the spirit of the invention as herein described, and the scope of the appended claim.

Having thus described my invention, what I claim as new is:—

A poultry catcher comprising in combination a hook including a shank having a leg disposed laterally thereto, a plate pivotally mounted intermediate its ends on said shank and having a jaw extending therefrom adapted to bridge the space between said shank and said leg, said plate adjacent one end thereof provided with a notch, a dog pivotally mounted on said shank and engageable with the notch for retaining said jaw in position, bridging the space between the shank and said leg, spring means connecting said latch and said plate normally urging said plate in one direction and for normally urging said latch in a direction toward said plate, said spring means having its longitudinal axis disposed laterally with respect to the axis of said plate, and stop means for limiting the swinging movement of said plate.

In testimony whereof I affix my signature.

FLOYD FISHER.